July 28, 1936.    R. HASE    2,049,260

PYROMETER

Filed Nov. 15, 1934

Inventor
RUDOLF HASE
by *Sika Kehlenbach*
Attorneys.

Patented July 28, 1936

2,049,260

UNITED STATES PATENT OFFICE 2,049,260

PYROMETER

Rudolf Hase, Hanover, Germany

Application November 15, 1934, Serial No. 753,125
In Germany November 17, 1933

1 Claim. (Cl. 88—14)

This invention relates to so-called color-pyrometers, i. e. to optical pyrometers with an incandescent electric lamp as source of comparison light, in which the temperature measuring of the object to be examined takes place in such a manner that between the light of the object and the light of the source of comparison light equality is established as regards brightness as well as color and the adjusting of the means provided in the instrument for these two purposes is measured.

The commonly used pyrometers of this type are equipped with two movable handles or similar elements, of which the one is adjusted for regulating to brightness equality and the other for regulating to color equality between the light of the object and that of the source of comparison light. The manipulation of the instrument is thereby rendered complicated, and accurate measurings can be made only by skilled and expert persons.

The invention has for its object to avoid these defects and it consists essentially in equipping the pyrometers of the type explained above with only one adjusting element to be operated by hand and adapted to carry out two kinds of movements, the one for establishing the brightness equality and the other for establishing the color equality between the light of the object and that of the source of comparison light.

Two embodiments of the invention are illustrated by way of example in the accompanying drawing in which:—

Figure 1:
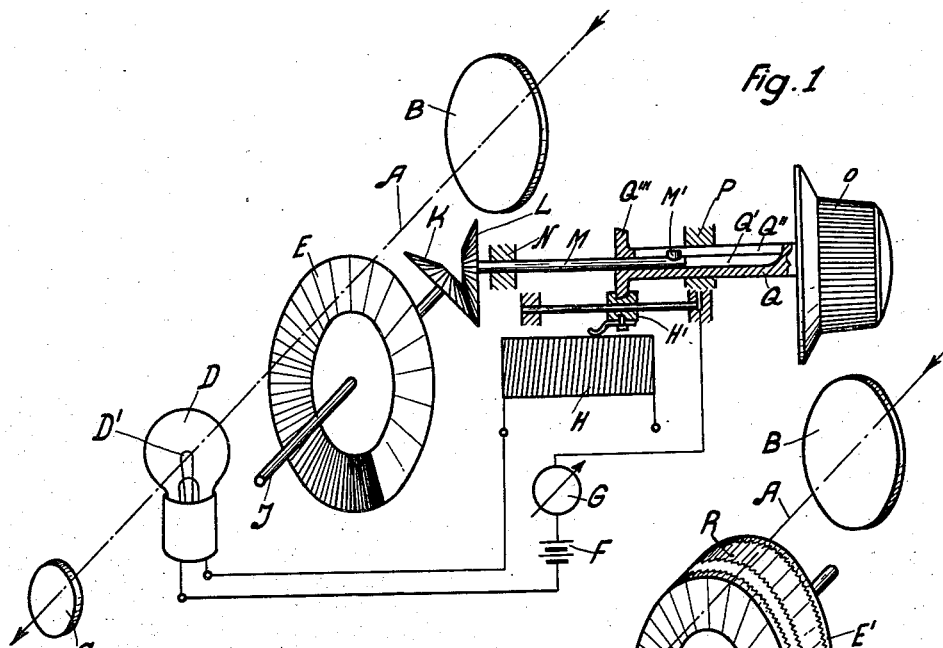
Fig. 1 shows a telescope-color pyrometer constructed according to the invention.

In the figures of the drawing the line A indicates a light ray emitted from the object to be examined, B the lens, C the eye-glass, D the small incandescent lamp serving as source of comparison light and E a rotatable so-called optical ring-wedge interposed in the path of the light ray A between the lens B and the incandescent lamp D.

In the form of construction shown in Fig. 1 the circuit of the incandescent lamp D comprises, besides a source of current F and an ammeter G, a regulating resistance H, constructed for instance as slide rheostat. The ring-wedge E is mounted on an axle I carrying on one end a bevel wheel K. A bevel wheel L keyed on the free end of a second axle M meshes with the bevel wheel K. The axle M is journalled in a journal N but not shiftable in the same, and its other end is connected with a hollow axle Q with adjusting knob O and journalled and shiftable in a bearing P, so that the axle M, when the axle Q is turned, is turned also but not shifted when the axle Q is shifted. With this object in view the axle M extends through the longitudinal bore Q' of axle Q and has a projection M' adapted to slide in a longitudinal groove Q'' of axle Q. The axle Q has an annular flange Q''' engaging with the groove of a sliding contact H' of the slide rheostat H.

If the knob O is pushed, the slide resistance H is changed and therewith also the intensity of the current flowing through the incandescent lamp D, so that the color as well as the brightness of its filament D' change. In this manner the light of the filament can be regulated to similar color or to similar brightness as the light of the object. According to whether the first or the second of these possibilities is selected, a neutral smoked glass or a colored, for instance red glass, has to be employed as material for the ring-wedge. If the knob O is merely turned, the ring-wedge C is turned and thereby, according to whether it is made of smoked glass or of colored glass, the brightness of the color of the light emitted by the object is changed. The knob O may, however, be simultaneously shifted and turned, so that the color and the brightness of the filament D' as also the brightness and color of the light emitted by the object are changed.

Figure 2:
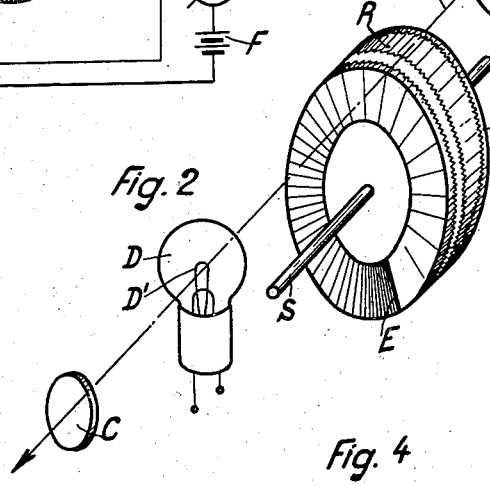
Fig. 2 shows another construction of a telescope-color pyrometer, the filament of small incandescent lamps serving in both figures as source of comparison light.

In the form of construction shown in Fig. 2 two parallel optical ring-wedges E, E' are arranged, spaced at a certain distance, between the lens B and the incandescent lamp D, which ring-wedges E, E' are adapted to be turned both around an axle S the one ring wedge, for instance E, being of smoked glass and the other of colored glass or inversely. A ring R, having teeth on both end faces, is arranged between the two ring-wedges, turnable around the axle S and shiftable in axial direction, the total thickness of this ring being slightly less than the distance between the ring wedges E, E'. These ring-wedges have teeth in the face facing the ring R. If the teeth of ring R, as shown on the drawing, engage with the teeth of the ring-wedge E' and if the ring R is turned, the ring-wedge E' is rotated also. If the ring R is shifted towards the incandescent lamp D the teeth facing the lens B disengage from the teeth of the ring-wedge E' and the teeth facing the incandescent lamp D engage with the teeth of the ring-wedge E, so that, when the ring R is turned, the ring-wedge E is rotated.

In this form of construction neither the brightness nor the color of the filament D' is changed, but—according to whether the ring-wedge E' or the ring-wedge E is rotated,—the color or brightness of the light emitted by the object.

Figure 3:
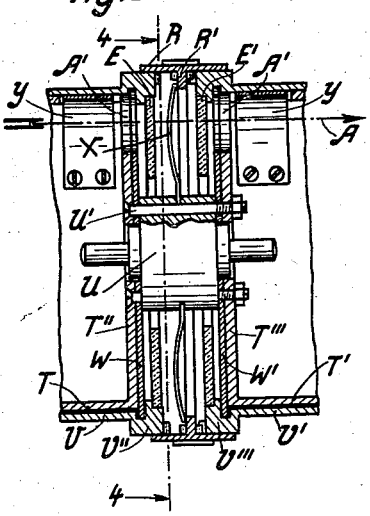
Fig. 3 shows in longitudinal section a detail of the construction of the pyrometer shown in Fig. 2.
Figure 4:
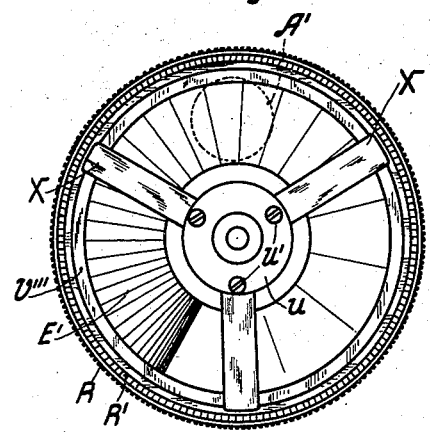
Fig. 4 is a cross section on line 4—4 of Fig. 3.

The apparatus illustrated only diagrammatically in Fig. 2 may be constructed as shown in Figs. 3 and 4. The casing of the pyrometer in the form of a tube consists of two parts T and T', which have each one on the end facing the other part an inwardly directed flange T'', T''' respectively. A cylindrical block U is arranged between the two flanges T'', T''' which is united to a rigid whole with these flanges and consequently also with the tubes T, T' by several screw bolts U'. Sleeves V, V' are placed on the tube T, T' so that they can be turned, the facing ends of these sleeves forming ring-flanges V'', V''', These ring-flanges have each two annular grooves in the inner sides. Discs W, W' situated between the flanges T'', T''' and the cylindrical block U engage with the outer annular grooves and are connected by the screw bolts U' with the block U and with the flanges T'', T'''. The diameter of the discs W, W' is slightly larger than that of the tubes T, T' in order to prevent the sleeves V, V' from slipping off these tubes. The inner annular grooves in the ring-flanges V'', V''' serve for mounting the two ring-wedges E, E'. Windows A' are arranged in the flanges T'', T''' and on the discs W, W' as passages for the light ray A entering in Fig. 3 for instance from the left and going out to the right. A ring R, milled on the outer edge and having a rib R' on the inner edge, is arranged between the two ring-flanges V'', V''' so that it can turn on these flanges. Radial springs X, fixed at the inner ends in the block U bear against the rib R' and push the ring R towards the right. The rib R' has teeth on both sides opposite the teeth on the inner sides of the ring-flanges V'', V'''. If the ring R is in the position shown in Fig. 3, the teeth on the right side of its rib R' engage in the teeth of the ring-flange V''', so that it rotates the sleeve V' and the ring-wedge E' when it is being turned. If, however, the ring R is shifted to the left, the teeth on the left side of its rib R' engage in the teeth of the ring-flange V'' so that, if it is being turned, it rotates the sleeve V and the ring-wedge E. To prevent the sleeves V, V' from accidentally turning on the tubes T, T' blade springs Y are arranged in the tubes, the outer ends of said springs extending through apertures in the tubes T, T' and bearing from the inside with friction against the sleeves V, V'.

I claim:—

In an optical pyrometer, the combination of a source of comparison light, two rotatably mounted optical wedges located along the same optical axis between the object to be examined and said source of comparison light, one of said optical wedges being neutral in color and graded in density and the other of said wedges being graded in color from one end to the other, said optical wedges being arranged respectively to change the brightness and the color emitted by said object, and an adjusting element movably mounted for engagement with either of said wedges selectively for the purpose of rotating the same.

RUDOLF HASE.